United States Patent [19]

Hackney

[11] Patent Number: 4,898,111

[45] Date of Patent: Feb. 6, 1990

[54] CATAMARAN SAILBOAT USER SUPPORT PLATFORMS AND PACKAGED ELEMENTS THEREFORE

[76] Inventor: John Hackney, 12420 Kelso Rd., Thonotosassa, Fla. 33592

[21] Appl. No.: 188,844

[22] Filed: May 2, 1988

[51] Int. Cl.$^4$ ............................................. B63B 1/00
[52] U.S. Cl. ..................................... 114/61; 114/108; 24/130; 403/319; 248/273
[58] Field of Search ............. 114/39.1, 61, 102, 108, 114/113, 219, 270, 345; 24/130, 265 R, 265 EE; 403/319, 316; 160/271, 290.1, 368.1, 391, 395; 248/273

[56] References Cited

U.S. PATENT DOCUMENTS

| | | | |
|---|---|---|---|
| 2,916,247 | 12/1959 | D'Azzo | 248/273 |
| 4,158,244 | 6/1979 | Stefan | 160/391 |
| 4,569,301 | 2/1986 | Pyburn | 114/61 |
| 4,660,497 | 4/1987 | Cochran | 114/345 |

Primary Examiner—Joseph F. Peters, Jr.
Assistant Examiner—Jesûs D. Sotelo
Attorney, Agent, or Firm—Carroll F. Palmer

[57] ABSTRACT

Catamaran sailboats have their user support platforms improved to prevent the trampoline from disengaging from its support tubes by interposing a plurality of small plastic retainers having a hook-like cross-section spaced apart along the inboard side of the tube slots of the pair of support tubes located approximately at the beam of the sailboat by which the trampoline is supported.

3 Claims, 1 Drawing Sheet

CATAMARAN SAILBOAT USER SUPPORT PLATFORMS AND PACKAGED ELEMENTS THEREFORE

BACKGROUND OF THE INVENTION

1. Field of the Invention

This invention relates to improvements in user support platforms for catamaran sailboats. More particularly, it concerns small retainer elements used to maintain such platforms properly positioned.

2. Description of the Prior Art

Catamaran sailboats typically have a pair of parallel hulls, usually V-shaped, held apart by some form of platform positioned on the hulls above the level of the water. In cruising type catamaran sailboats, this platform is large and contains a cabin with living quarters. This invention is not concerned with such cruising class of catamaran sailboats.

Another class of catamaran sailboats that is very popular is the so-called "day-sailor" of racing type which are typically between about 12 to 20 feet in length with a beam of about 6 to 10 feet. In such boats, the platform upon which the persons sailing them are supported is a section of fabric stretched across a tubular frame carried upon the twin hulls of the sailboat. This platform is called a "trampoline" in the trade since the fabric section, being unsupported except at the peripherial edges, is quite springy and behaves much like a conventional trampoline.

With one or more persons moving actively about the trampoline on the racing type catamarans, great stresses are applied to peripherial edges thereof. This can lead to a separation of the connection of the fabric section from the support frame and this invention provides means to mitigate such separation.

OBJECTS

A principal object of the invention is the provision of improvements in user support platforms for catamaran sailboats.

A further object is the provision of means to mitigate the separation of the fabric section of the trampoline in racing type catamaran sailboats from the frame unit upon which such fabric section is supported.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by improving user support platforms on catamaran sailboats.

The platforms to which the inventions pertains comprise a pair of parallel metal support tubes spaced apart approximately the beam of the sailboat. Each such tube has a longitudinal slot on the inboard side thereof and a fabric trampoline is stretched between the tubes by having beaded edges on the outboard sides thereof captured within the tube slots.

With the weight of persons moving around the trampoline, there is a tendency for the beaded edge thereof to pull out of the tube slot, particularly as the boat and its equipment age. When this occurs, the trampoline can fall from its support frame.

The improvement of the invention for preventing the trampoline from disengaging from its support tubes comprises a plurality of retainers spaced apart along the tube slots interposed between the tube slots and the beaded edges. The retainers are molded of plastic and have a hook-like cross-section. Typically, the retainer are about 4 cm. long and about 1.3 cm. wide.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
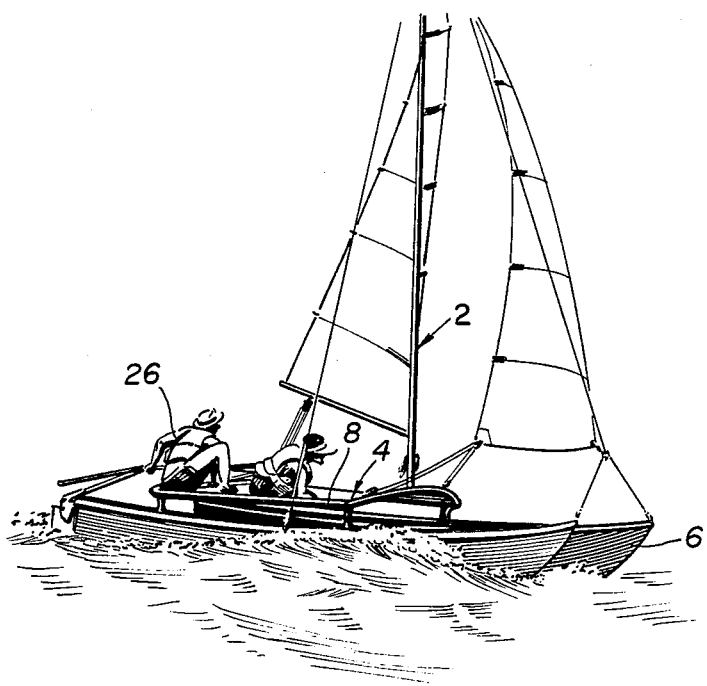
FIG. 1 is a perspective view of a catamaran sailboat of the type to which this invention pertains.
Figure 2:
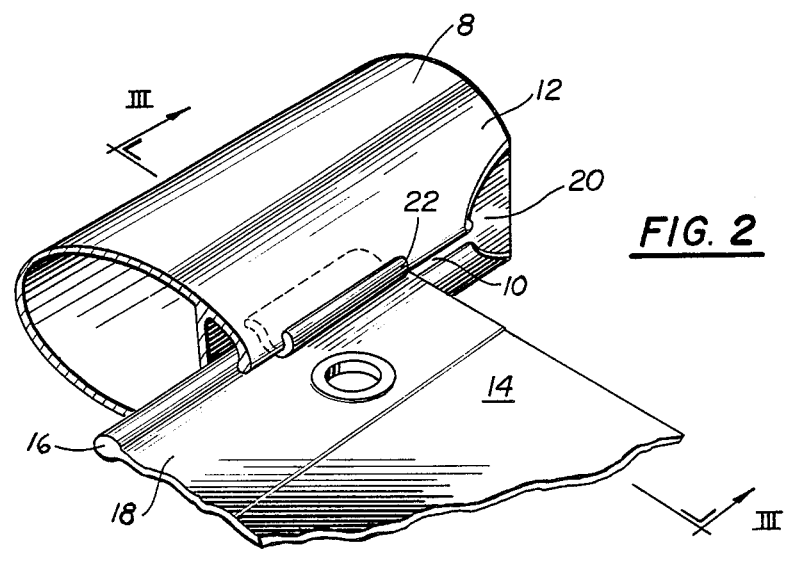
FIG. 2 is a fragmentary, sectional, isometric view of a portion of the person support platform of the sailboat of FIG. 1.
Figure 4:
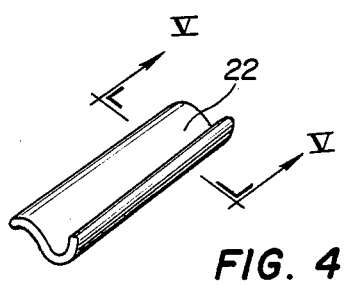
FIG. 4 is an isometric view of a trampoline retainer of the invention.
Figure 3:
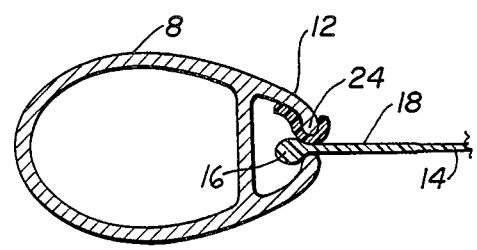
FIG. 3 is a sectional view taken on the line III—III of FIG. 2.

Referring in detail to the drawings, in which identical parts are identically marked, the invention relates to catamaran sailboats of the type 2 equipped with a user support platform 4 carried by the V-shaped hulls 6.

The platform 6 comprising a pair of parallel metal support tubes 8 spaced apart approximately the beam of the sailboat 2. Each tube 8 has a longitudinal slot 10 on the inboard side 12 thereof. A trampoline 14 is stretched between the tubes 8 by having beaded edges 16 on the outboard sides 18 thereof captured within the tube slots 10.

At the end of the slots 10, the inboard side 12 of tubes 8 are partially cut away to form an opening 20 through which the beaded edge 16 can be fed into the slot 10.

The improvement for preventing the trampoline 14 from disengaging from its support tubes 8 comprises a plurality of retainers 22 spaced apart along the tube slots 10 interposed between the lips 24 of the tube slots 10 and the beaded edges 16.

Figure 5:
FIG. 5 is a sectional view taken on the line V—V of FIG. 4.
Figure 6:
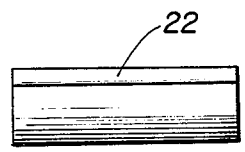
FIG. 6 is a plan view of the retainer shown in FIG. 4.

As shown in FIG. 5, the retainers 22 have a hook-like cross-section and as seen in FIG. 6 have a length about 3 times their width.

The retainers 22 are merchandized by enclosing in a package (not shown) the number of them that is required to be installed on a particular size of sailboat, e.g., a "Hobie 16", in order to serve to prevent the trampoline 14 from pulling out of slots 10 when the sailors 26 move about on the sailboat 2.

The embodiments of the invention in which an exclusive property or privilege is claimed are defined as follows:

1. In a catamaran sailboat equipped with a user support platform comprising a pair of parallel metal support tubes spaced apart approximately the beam of the sailboat, each said tube having a longitudinal slot on the inboard side thereof, and a trampoline stretched between said tubes by having beaded edges on the outboard sides thereof captured within said tube slots, the improvement for preventing the trampoline from disengaging from its support tubes that comprises a plurality of retainers spaced apart along said tube slots interposed between said tube slots and said beaded edges, said retainers being elongate web elements of substantially uniform web thickness and having a hook-like cross-section.

2. The catamaran sailboat improvement of claim 1 wherein said retainers are molded of plastic material.

3. The catamaran sailboat improvement of claim 2 wherein said retainers have a length about 3 times their width.

* * * * *